(12) United States Patent
Kim et al.

(10) Patent No.: US 11,175,626 B2
(45) Date of Patent: Nov. 16, 2021

(54) ON-AXIS AND OFF-AXIS DIGITAL HOLOGRAM GENERATING DEVICE AND METHOD

(71) Applicant: NAEILHAE, CO. LTD., Seongnam-si (KR)

(72) Inventors: Byung Mok Kim, Seoul (KR); Mal Eum Sung, Seoul (KR); Seong Jin Park, Seoul (KR); Sang Jin Lee, Seoul (KR)

(73) Assignee: NAEILHAE, CO. LTD., Seongnam-si (KR)

(*) Notice: Subject to any disclaimer, the term of this patent is extended or adjusted under 35 U.S.C. 154(b) by 205 days.

(21) Appl. No.: 16/173,770

(22) Filed: Oct. 29, 2018

(65) Prior Publication Data
US 2019/0171162 A1 Jun. 6, 2019

Related U.S. Application Data

(63) Continuation of application No. PCT/KR2017/014075, filed on Dec. 4, 2017.

(51) Int. Cl.
*G03H 1/08* (2006.01)
*G03H 1/04* (2006.01)
(Continued)

(52) U.S. Cl.
CPC ......... *G03H 1/0866* (2013.01); *G03H 1/0005* (2013.01); *G03H 1/0443* (2013.01);
(Continued)

(58) Field of Classification Search
CPC .. G03H 1/0866; G03H 1/0808; G03H 1/0443; G03H 1/0005; G03H 1/0404;
(Continued)

(56) References Cited

U.S. PATENT DOCUMENTS 5,651,901 A 7/1997 Mohri et al.
5,668,648 A * 9/1997 Saito ................... G03H 1/0841
359/9
(Continued)

FOREIGN PATENT DOCUMENTS

JP 2009-63682 A 3/2009
JP 2010-169970 A 8/2010
(Continued)

OTHER PUBLICATIONS

Definition 5 of Controller, Oxford English Dictionary, Third Edition, Dec. 2015, available at: https://www.oed.com/view/Entry/40567?redirectedFrom=controller& (Year: 2015).*
(Continued)

*Primary Examiner* — Kimberly N. Kakalec
(74) *Attorney, Agent, or Firm* — Buchanan Ingersoll & Rooney PC

(57) ABSTRACT

Provided are on-axis and off-axis digital hologram generating device and method.
The on-axis and off-axis digital hologram generating device includes an object phase generator configured to access a phase file of an object stored in a storage device and generate object phase information from the phase file of the object; a digital object light generator configured to generate digital object light information based on a light property of object light input by a user and the object phase information generated by the object phase generator; a digital reference light generator configured to generate digital reference light information based on a light property of reference light input by the user; and a digital hologram generator configured to generate a digital hologram based on hologram property information input by the user, the digital object light information generated by the digital object light generator, and
(Continued)

the digital reference light information generated by the digital reference light generator.

9 Claims, 8 Drawing Sheets

(51) Int. Cl.
    *G03H 1/00*     (2006.01)
    *H04N 5/369*     (2011.01)

(52) U.S. Cl.
    CPC ......... *G03H 1/0808* (2013.01); *G03H 1/0404* (2013.01); *G03H 2001/0088* (2013.01); *G03H 2001/0445* (2013.01); *G03H 2001/0447* (2013.01); *G03H 2001/0452* (2013.01); *G03H 2210/30* (2013.01); *G03H 2226/02* (2013.01); *G03H 2226/11* (2013.01); *H04N 5/369* (2013.01)

(58) Field of Classification Search
    CPC ... G03H 2001/0445; G03H 2001/0452; G03H 2226/02; G03H 2226/11; G03H 2001/0088; G03H 2001/0447; G03H 2210/30; H04N 5/369
    See application file for complete search history.

(56) References Cited

U.S. PATENT DOCUMENTS

| | | | |
|---|---|---|---|
| 6,771,402 B2 * | 8/2004 | Snider | G03H 1/0808 348/40 |
| 2015/0253730 A1 | 9/2015 | Cho et al. | |

FOREIGN PATENT DOCUMENTS

| | | |
|---|---|---|
| KR | 0154178 B1 | 11/1998 |
| KR | 10-0808540 B1 | 2/2008 |
| KR | 101081001 B1 | 11/2011 |
| KR | 10-2012-0118621 A | 10/2012 |
| KR | 101308011 B1 | 9/2013 |
| KR | 10-1379327 B1 | 4/2014 |
| KR | 10-1412053 B1 | 6/2014 |
| KR | 10-1421984 B1 | 7/2014 |
| KR | 10-1489356 B1 | 2/2015 |
| KR | 10-1499804 B1 | 3/2015 |
| KR | 101573362 B1 | 12/2015 |
| KR | 10-1839368 B1 | 3/2018 |
| WO | 2012144834 A2 | 10/2012 |

OTHER PUBLICATIONS

Cai et al., "Sensitivity adjustable contouring by digital holography and a virtual reference wavefront", Optics Communications, Jun. 1, 2003, pp. 49-54, vol. 221, Issues 1-3, Elsevier Science B.V.

International Search Report dated Aug. 29, 2018, by the Korean Intellectual Property Office in corresponding International Application No. PCT/KR2017/014075. (3 pages).

Kim, Seung-Cheol, et al., "Accelerated one-step generation of full-color holographic videos using a color-tunable novel-look-up-table method for holographic three-dimensional television broadcasting", Scientific Reports, Sep. 2015 (10 pages).

\* cited by examiner

Background Art

Optically obtained hologram    Digital generated hologram
                               [off-Axis Mode]

On-Axis Mode    Off-Axis Mode    Off-Axis Spatial
                                 Move Mode

ON-AXIS AND OFF-AXIS DIGITAL HOLOGRAM GENERATING DEVICE AND METHOD

TECHNICAL FIELD

The present disclosure relates to an on-axis and off-axis digital hologram generating device and method.

More specifically, the present disclosure relates to an on-axis and off-axis digital hologram generating device and method configured to simulate interference patterns of a wave optics-based digital hologram and generate a digital hologram by digitally synthesizing virtual object light and virtual reference light both having phase information of an object of which a hologram is required to be generated. Thus, compared to a conventional digital hologram restoring device using a computer-generated hologram (CGH), a hologram may be restored without having to use a complicated and expensive optical device, a same hologram as an optically obtained actual hologram may be generated, a time period for which the hologram is generated may be reduced, and a problem of using a large capacity of memory of a computer may be solved. In addition, when a research and/or an experiment using a hologram are performed, since a pre-feasibility test for determination of occurrence of a failure of the research and/or the experiment or prediction of a final result may be performed in advance by using a simulation for generation of a hologram, waste of time and personnel due to unnecessary repeated researches and/or experiments may be significantly reduced. In addition, the device and method may be highly utilized to educate personnel specialized in holograms and students.

BACKGROUND ART

A digital holography microscope refers to a microscope measuring a shape of an object by utilizing a digital holography technology.

A general microscope is a device measuring a shape of an object by emitting a general light source toward the object and measuring a strength of light reflected or transmitted from the object. On the other hand, the digital holography microscope is a device measuring light interference and diffraction phenomena occurring when light is emitted toward an object and digitally recording the measured light interference and diffraction phenomena to thereby restore shape information of the object from information of the digitally recorded light interference and diffraction phenomena.

That is, the digital holography technology is a technology generating light having a single wavelength like laser, splitting the light into 2 pieces by using a beam splitter, emitting one of the 2 pieces of light directly toward an image sensor (hereinafter referred to as reference light) and the other of the 2 pieces of light toward an object to be measured to direct light reflected from the object to be measured (hereinafter referred to as object light) toward an image sensor so that the reference light and the object light generate an interference phenomenon in the image sensor, recording interference pattern information of the light, and restoring a shape of the object to be measured with the recorded interference pattern information by using a computer. The recorded interference pattern information is generally referred to as a hologram.

Other than digital holography, a general optical holography technology uses a method of recording the interference pattern information of light on a special film and emitting the reference light toward the special film on which the interference pattern information is recorded to thereby restore a virtual shape of the object to be measured in an original position of the object to be measured.

Compared to the general optical holography technology method, the digital holography microscope is different from the general optical holography technology method in that the digital holography microscope restores a shape of an object to be measured by measuring interference pattern information of light by using a digital image sensor, storing the interference pattern information by using a digital method, and processing the stored interference pattern information by using a numeric operation method using a computer device, etc., instead of an optical method.

There are cases when the general digital holography microscope uses a laser light source with a single wavelength. However, when the single wavelength is used, there is such a problem that a measurement resolution for an object, that is, a minimum measurement unit is limited to a wavelength of the laser light source. In addition, when the general digital holographic microscope uses a laser light source with a 2 or multiple wavelengths, there are such problems that the general digital holographic microscope uses light sources with different wavelengths, thus increasing a cost or holograph images are sequentially obtained by using light sources with different wavelengths, thus making it difficult to, in real time, measure 3-dimensional (3D) change information of an object to be measured.

In addition, in the general digital holograph technology, a computer-generated hologram (CGH) is generated to restore a shape of the object to be measured by using a computer and displayed on a spatial light modulator (SLM). Then, reference light is emitted to the CGH, and then, a 3D hologram image of the object is obtained according to diffraction of the reference light.

In detail, FIG. 1A is a schematic diagram illustrating holographic recording and hologram generation according to a conventional digital holography technology. FIG. 1B is a diagram illustrating a processing operation according to a conventional digital holography technology.

Referring to FIG. 1A, the conventional digital holograph technology includes data obtainment-restoration-generation-display technologies based on interference of light. That is, the conventional digital holography technology is a technology of recording a fringe pattern (an interference pattern) between object light and reference light reflected from a 3D object (a left drawing in FIG. 1A) and diffracting and refracting the obtained fringe pattern (the interference pattern) to thereby restore an image of the object in 3D. In FIG. 1A, the fringe pattern (the interference pattern) is a pattern record shown in a lower part of the left drawing in FIG. 1A. A 3D restored image is an image having a cubic effect in a lower part of a right drawing in FIG. 1A.

Referring to FIG. 1B, in the conventional digital holography technology, 3D image information of a target object is obtained by using a general optical holography technology. Then, the obtained 3D image information is stored in a digital image sensor including a charge-coupled device (CCD) or a complementary metal-oxide semiconductor image sensor (CMOS). Then, the stored 3D image information undergoes digital processing. The digital processing includes: 1) obtaining 3D model data; 2) processing generation of the CGH from the obtained 3D model data; and 3) obtaining hologram data from the generated CGH. Here, the final obtained hologram data is a hologram in which holography fringe patterns (interference patterns) obtained by a photoelectronic equipment including the CCD or the CMOS or generated by using a mathematical model overlap each other, and includes information of 3D object data. Then, the final obtained hologram data is used to restore the target object in a 3D image by using the SLM.

The CGH used for the conventional digital holography technology uses a fringe-pattern algorithm based on a point source to generate fringe patterns (interference patterns). To use the fringe-pattern algorithm based on a point source, a large capacity of memory is required for a computer and a great amount of time is also required due to a low speed of generation of a hologram. According to a general CGH method, when a calculation speed per 1 point is about 60.67 milliseconds (ms) and a hologram with a resolution of 1024×1024 is generated based on the calculation speed of about 60.67 ms, it takes about 63617.10 seconds a memory of about 6 GB (1024×1024×8 bit+1024×1024×8 bitsx768=6 GB) is used. According to a recent thesis on the CGH proposed to enhance a usage amount and a speed of a memory (Accelerated one-step generation of full-color holographic videos using a color-tunable novel-look-up-table method for holographic three-dimensional television broadcasting, Seung-Cheol, Kim et. al. Scientific Reports, September 2015), a calculation speed per 1 point is about 2.55 ms. When a hologram with a same resolution as that of the above-described condition is generated based on the calculation speed of about 2.55 ms, it takes about 2673.86 seconds and a memory of 12 GB (1024×1024×8 bits+1024×1×8 bitsx1024=12 GB) is used.

In addition, in the conventional digital holography technology, a hologram is optically restored by using the SLM. To use the SLM, an additional optical device such as a laser or optical system, etc. is required to be used. Accordingly, in the conventional digital holography technology, the expensive SLM is required to be used, and a whole device still has a complicated structure.

In addition, in the conventional digital holography technology, to restore holograms of different objects, operations of recording fringe patterns (interference patterns) between object light and reference light (the left drawing in FIG. 1A) respectively for different objects as described above and restoring an image of an object in 3D by diffracting and refracting fringe patterns (interference patterns) obtained by using CGH technology need to be respectively performed. Accordingly, same operations need to be performed repeatedly to generate holograms of the different objects, and thus, a great amount of time and a great number of personnel are required.

In addition, in the conventional digital holography technology, for example, when a research and/or an experiment are performed by using a hologram, it may not be possible to perform a pre-feasibility test for determination of occurrence of a failure of the research and/or the experiment or prediction of a final result.

Accordingly, a new plan to resolve the above-described problem is required.

PRIOR ART LITERATURE

Patent Literature (Patent Literature 1) 1. KR Patent No. 10-2108001
(Patent Literature 2) 2. KR Patent No. 10-1308011
(Patent Literature 3) 3. KR Patent No. 10-1379327
(Patent Literature 4) 4. KR Patent No. 10-1412053
(Patent Literature 5) 5. KR Patent No. 10-1421984
(Patent Literature 6) 6. KR Patent No. 10-1489356
(Patent Literature 7) 7. KR Patent No. 10-1499804
(Patent Literature 8) 8. KR Patent No. 10-154178
(Patent Literature 9) 9. KR Patent No. 10-1573362

Non-Patent Literature (Non-Patent Literature 1) Accelerated one-step generation of full-color holographic videos using a color-tunable novel-look-up-table method for holographic three-dimensional television broadcasting, Seung-Cheol, Kim et. al. Scientific Reports, September 2015

DESCRIPTION OF EMBODIMENTS

Technical Problem

Provided are on-axis and off-axis digital hologram generating device and method configured to solve the problems of the conventional technology described above by simulating interference patterns of a wave optics-based digital hologram and generating a digital hologram by digitally synthesizing virtual object light and virtual reference light both having phase information of an object of which a hologram is required to be generated. Thus, compared to a conventional digital hologram restoring device using a computer-generated hologram (CGH), a hologram may be restored without having to use a complicated and expensive optical device, a same hologram as an optically obtained actual hologram may be generated, a time period for which the hologram is generated may be reduced, and a problem of using a large capacity of memory of a computer may be solved. In addition, when a research and/or an experiment using a hologram are performed, since a pre-feasibility test for determination of occurrence of a failure of the research and/or the experiment or prediction of a final result may be performed in advance by using a simulation for generation of a hologram, waste of time and personnel due to unnecessary repeated researches and/or experiments may be significantly reduced. In addition, the device and method may be highly utilized to educate personnel specialized in holograms and students Solution to Problem According to an aspect of the present disclosure, an on-axis and off-axis digital hologram generating device includes: an object phase generator configured to access a phase file of an object stored in a storage device and generate object phase information from the phase file of the object; a digital object light generator configured to generate digital object light information based on a light property of object light input by a user and the object phase information generated by the object phase generator; a digital reference light generator configured to generate digital reference light information based on a light property of reference light input by the user; and a digital hologram generator configured to generate a digital hologram based on hologram property information input by the user, the digital object light information generated by the digital object light generator, and the digital reference light information generated by the digital reference light generator.

According to an aspect of the present disclosure, an on-axis and off-axis digital hologram generating method includes: a) accessing a phase file of an object stored in a storage device and generate object phase information from the phase file of the object; b) generating digital object light and information based on physical information of object light input by a user, and object phase information data converted into object phase information data that may generate digital object light from the object phase information; c) generating digital reference light and information based on physical information of reference light input by the user; and d) generating a digital hologram based on hologram property information input by the user, the generated digital object light information, and the generated digital object light information.

Advantageous Effects of Disclosure

By using an on-axis and off-axis digital hologram generating device and method described above, compared to a conventional digital hologram restoring device using a conventional computer-generated hologram (CGH) technology, advantages described herein may be obtained.

1. A hologram may be restored without having to use a complicated and expensive optical device.

2. A same hologram as an optically obtained actual hologram may be generated.

3. A time period for which a hologram is generated may be reduced, and a problem of using a large capacity of memory of a computer may be solved.

4. When a research and/or an experiment using a hologram are performed, since a pre-feasibility test for determination of occurrence of a failure of the research and/or the experiment or prediction of a final result may be performed in advance by using a simulation for generation of a hologram, waste of time and personnel due to unnecessary repeated researches and/or experiments may be significantly reduced.

5. The on-axis and off-axis digital hologram generating device and method may be highly utilized to educate personnel specialized in holograms and students.

Additional advantages of the present disclosure may be apparently understood from a description provided herein, with reference to the accompanying drawings in which like numbers refer to like elements.

BEST MODE

Hereinafter, the present disclosure will be described in detail with reference to embodiments of the present disclosure and the accompanying drawings.

Figure 1A:
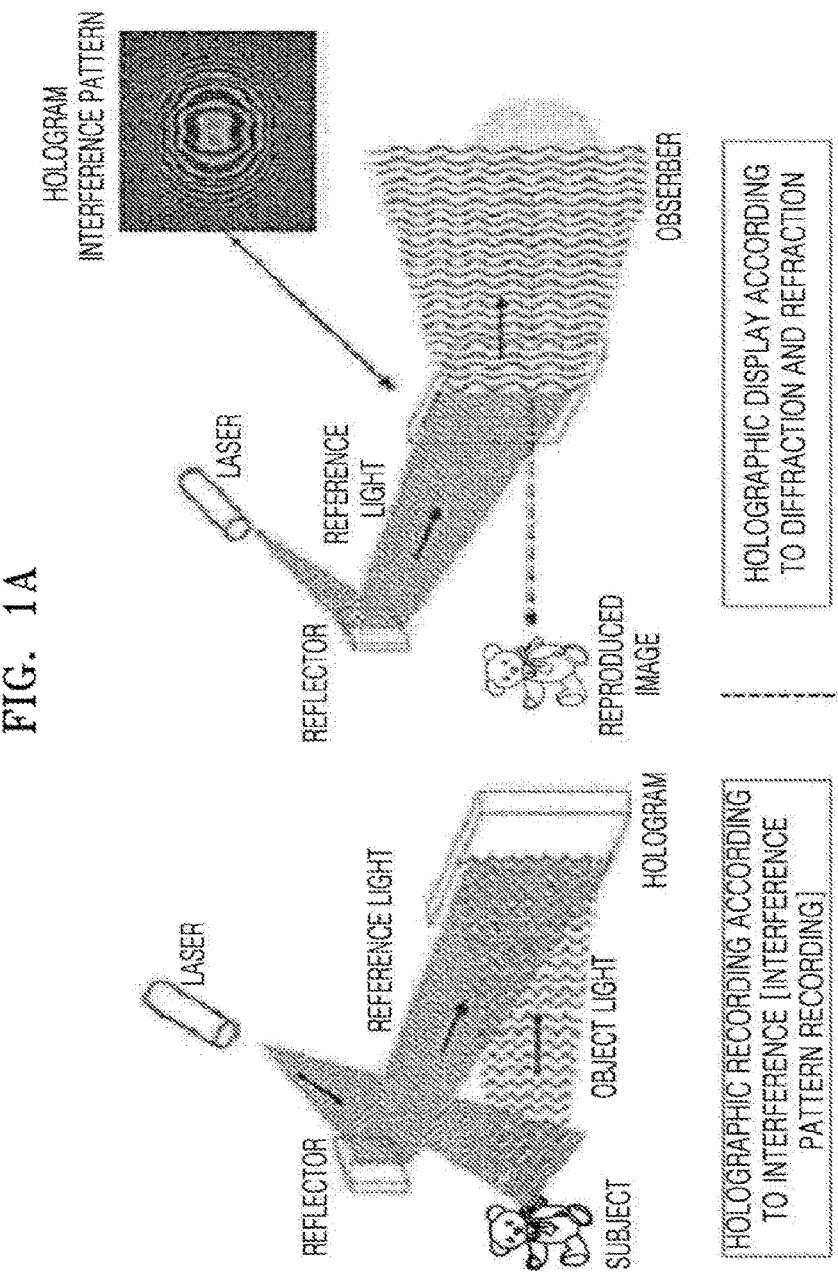
FIG. 1A is a schematic diagram illustrating holographic recording and hologram generation according to a conventional digital holography technology.
Figure 1B:
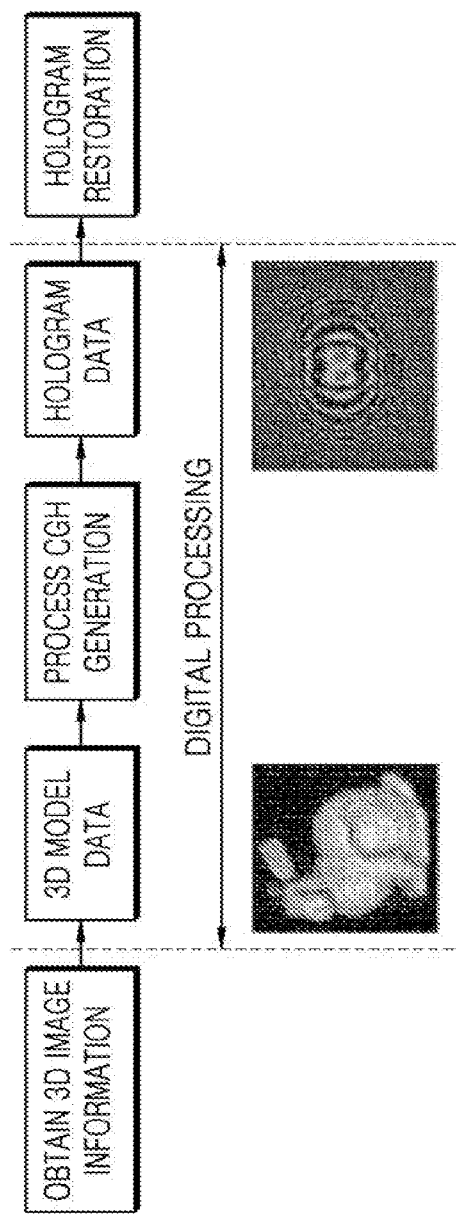
FIG. 1B is a diagram illustrating a processing operation according to the conventional digital holography technology.
Figure 2A:
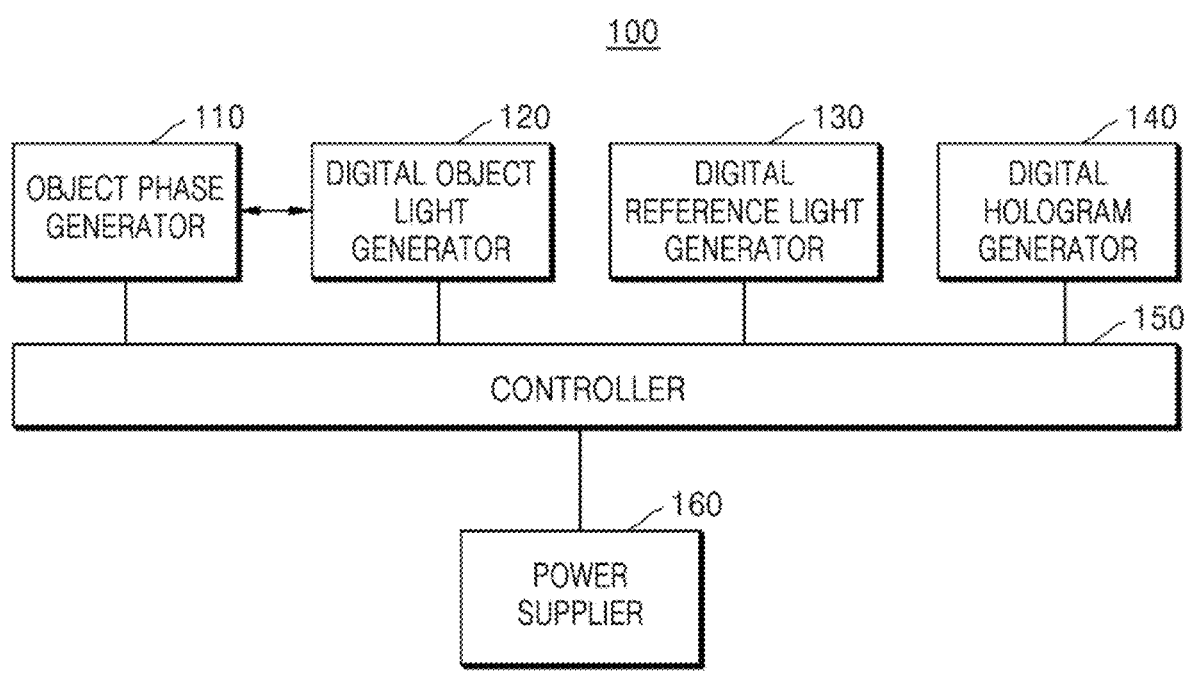
FIG. 2A is a block diagram of an on-axis and off-axis digital hologram generating device according to an embodiment of the present disclosure.

FIG. 2A is a block diagram of an on-axis and off-axis digital hologram generating device 100 according to an embodiment of the present disclosure.

Referring to FIG. 2A, according to an embodiment of the present disclosure, the on-axis and off-axis digital hologram generating device 100 includes an object phase generator 110 configured to access a phase file of an object stored in a storage device (not shown) and generate object phase information from the phase file of the object; a digital object light generator 120 configured to generate digital object light information based on light property of object light input by a user and the object phase information generated by the object phase generator 110; a digital reference light generator 130 configured to generate digital reference light information based on light property of reference light input by the user; and a digital hologram generator 140 configured to generate a digital hologram based on hologram property information input by the user, the digital object light information generated by the digital object light generator 120, and the digital reference light information generated by the digital reference light generator 130.

According to the embodiment of the present disclosure described above, the on-axis and off-axis digital hologram generating device 100 includes a controller 150 configured to control all operations of each component (that is, the object phase generator 110, the digital object light generator 120, the digital reference light generator 130, and the digital hologram generator 140) of the on-axis and off-axis digital hologram generating device 100 according to an embodiment of the present disclosure; and a power supplier 160 configured to supply power to each component (that is, the object phase generator 110, the digital object light generator 120, the digital reference light generator 130, the digital hologram generator 140, and the controller 150) of the on-axis and off-axis digital hologram generating device 100 according to an embodiment of the present disclosure.

Hereinafter, detailed configurations and operations of the object phase generator 110, the digital object light generator 120, the digital reference light generator 130, and the digital hologram generator 140 included in the on-axis and off-axis digital hologram generating device 100 according to an embodiment of the present disclosure described with reference to FIG. 2A are described in detail.

Figure 2B:
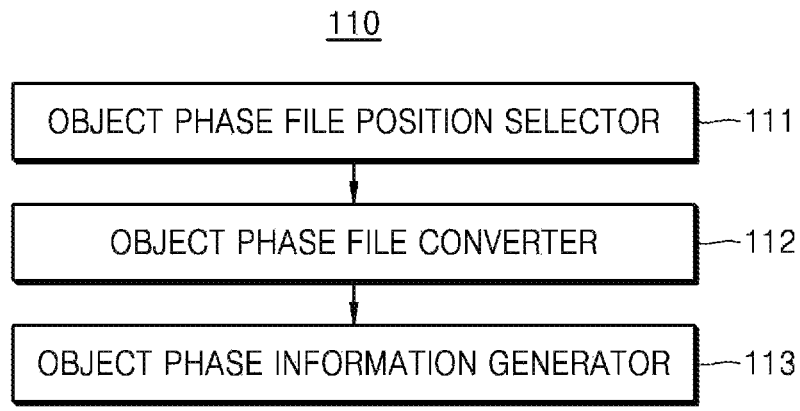
FIG. 2B is a detail block diagram of an object phase generator included in the on-axis and off-axis digital hologram generating device according to an embodiment of the present disclosure described with reference to FIG. 2A.
Figure 2C:
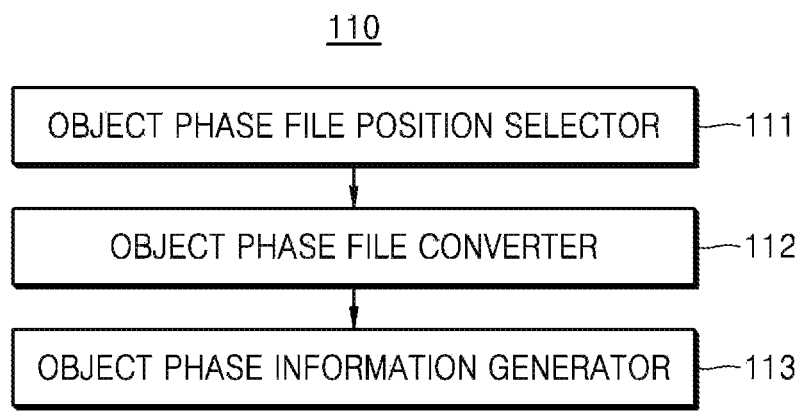
FIG. 2C is a detailed block diagram of a digital object light generator included in the on-axis and off-axis digital hologram generating device according to an embodiment of the present disclosure described with reference to FIG. 2A.
Figure 2D:
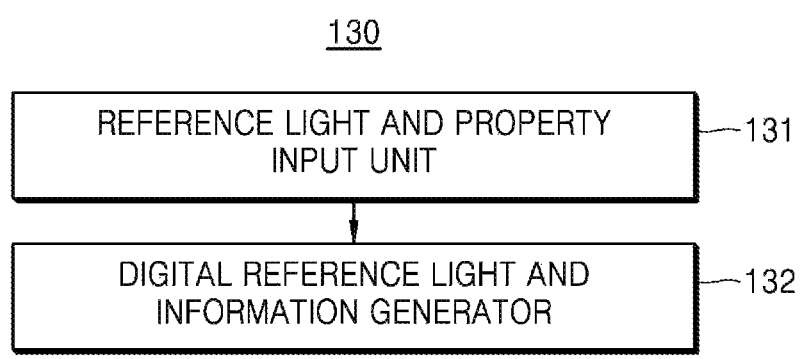
FIG. 2D is a detailed block diagram of a digital reference light generator included in the on-axis and off-axis digital hologram generating device according to an embodiment of the present disclosure described with reference to FIG. 2A.
Figure 2E:
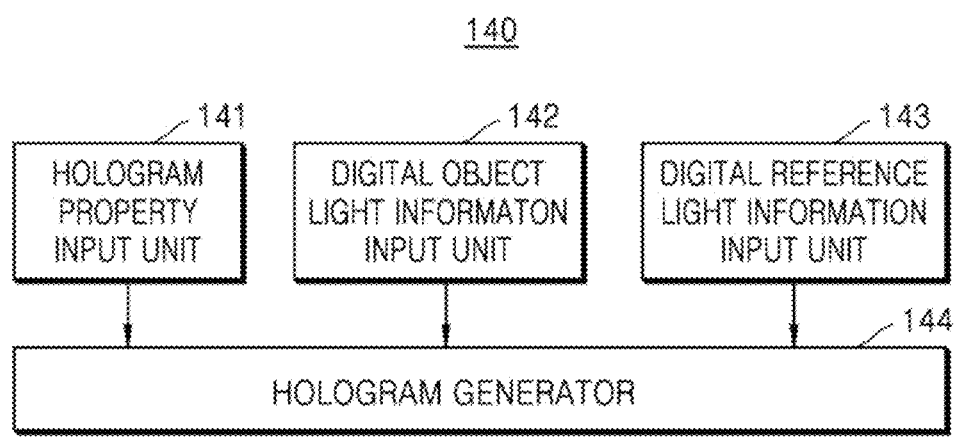
FIG. 2E is a detailed block diagram of a digital hologram generator included in the on-axis and off-axis digital hologram generating device according to an embodiment of the present disclosure described with reference to FIG. 2A.

FIG. 2B is a detail block diagram of the object phase generator 110 included in the on-axis and off-axis digital hologram generating device 100 according to an embodiment of the present disclosure described with reference to FIG. 2A. FIG. 2C is a detailed block diagram of the digital object light generator 120 included in the on-axis and off-axis digital hologram generating device 100 according to an embodiment of the present disclosure described with reference to FIG. 2A. FIG. 2D is a detailed block diagram of the digital reference light generator 130 included in the on-axis and off-axis digital hologram generating device 100 according to an embodiment of the present disclosure described with reference to FIG. 2A. FIG. 2E is a detailed block diagram of the digital hologram generator 140 included in the on-axis and off-axis digital hologram generating device 100 according to an embodiment of the present disclosure described with reference to FIG. 2A.

Referring to FIG. 2B with FIG. 2A, in the on-axis and off-axis digital hologram generating device 100 according to an embodiment of the present disclosure, the object phase generator 110 includes an object phase file position selector 111, an object phase file converter 112, and an object phase information generator 113. The object phase file position selector 111 selects and calls a phase file of an object stored in a storage device (not shown). In this case, the phase file of the object may be stored, for example, in a database in a storage device (not shown) in a user's personal computer (PC) or a database in a storage device (not shown) in an additional external server. Here, the selected phase file of the object may be displayed, for example, on a display unit (not shown). The display unit may include, for example, a monitor of a PC, a desktop computer, or the like implemented by the on-axis and off-axis digital hologram generating device 100 according to an embodiment of the present disclosure; a display device included in a laptop computer, a palmtop computer, a personal digital assistant (PDA), a cellular phone, etc. implemented by the on-axis and off-axis digital hologram generating device 100 according to an embodiment of the present disclosure; or an external monitor such as a TV screen, etc. connected to be separate from the on-axis and off-axis digital hologram generating device 100 according to an embodiment of the present disclosure. However, the display unit is not limited thereto.

The phase file of the object selected by the object phase file position selector 111 is transmitted to the object phase file converter 112. The object phase file converter 112 converts the phase file of the object into phase information data in a form that may be used by the object phase information generator 113 and transmits the converted phase file of the object to the object phase information generator 113. The object phase information generator 113 generates object phase information in a form that may be used by the object phase information input unit 122 included in the digital object light generator 120 which will be described later. Here, the phase information data includes magnification phase information of the object, magnification information of an object lens used when the magnification phase information of the object is recorded, and header information for storing and calling data in the storage device. In addition, the object phase information refers to phase information of the object obtained when the object lens is not used, based on the magnification phase information of the object obtained from the phase information data and the magnification information of the object lens used when the magnification phase information of the object is recorded.

Referring to FIG. 2A with FIG. 2C, in the on-axis and off-axis digital hologram generating device 100 according to an embodiment of the present disclosure, the digital object light generator 120 includes an object light property input unit 121; an object phase information converter 122; and a digital object light and information generator 123. The object light property input unit 121 provides an object light information input window to the display unit (not shown) into which a user may input physical information of object light that the user wants. Accordingly, the user may input conditions of the physical information of the object light including light wavelength information, wavenumber information, amplitude information, etc. of the object light that the user needs to digitally generate light. In addition, the object phase information converter 122 is connected to the object phase information generator 113 included in the object phase input unit 110 of FIG. 2B to obtain object phase information and converts the obtained object phase information into object phase information data that may generate actual digital object light. Here, the object phase information refers to phase information of the object generated by the object phase information generator 113 and obtained when the object lens is not used. The object phase information data obtained by the converting performed by the object phase information generator 122 refers to data reprocessed based on physical information input to the object light property input unit 121 by the user. The physical information of the object light input via the object light property input unit 121 and the object phase information data obtained by the converting performed by the object phase information input unit 122 are input to the digital object light and information generator 123. The digital object light and information generator 123 generates digital object light and information based on the input physical information of the object light and the object phase information data obtained by the converting. Digital object light information generated by the digital object light and information generator 123 includes object recorded position information, object phase information, and light property information. This may be expressed as Equation 1 below.

$$U_{DO}(x,y)=U_L(x,y)U_O(x,y)U_{OP}(x,y) \qquad \text{Equation 1}$$

In Equation 1 above, $U_{DO}(x,y)$ represents digital object light, $U_L(x,y)$ represents the light property information of the object light, $U_O(x,y)$ represents converted object phase information, and $U_{OP}(x,y)$ represents object recorded position information.

Referring to FIG. 2D with FIG. 2A, in the on-axis and off-axis digital hologram generating device 100 according to an embodiment of the present disclosure, the digital reference light generator 130 includes a reference light property input unit 131 and a digital reference light and information generator 132. The reference light property input unit 131 provides a reference light information input window to the display unit (not shown) into which the user may input physical information of reference light that the user wants. Accordingly, the user may input conditions of the physical information of the reference light including light wavelength information, wavenumber information, amplitude information, etc. of the reference light that the user needs to digitally generate light. The physical information of the reference light input via the reference light property input unit 131 is transmitted to the digital reference light and information generator 132. The digital reference light and information generator 132 generates digital reference light and information based on the input physical information of the reference light.

The digital object light information generated by the digital object light and information generator 123 shown in FIG. 2C and the digital reference light information generated by the digital reference light and information generator 132 shown in FIG. 2D, described above, are input to the digital hologram generator 140 shown in FIGS. 2A and 2E and used to generate a digital hologram.

In detail, referring to FIG. 2E with FIGS. 2A through 2D, in the on-axis and off-axis digital hologram generating device 1100 according to an embodiment of the present disclosure, the digital hologram generator 140 includes a hologram property input unit 141, a digital object light information input unit 142, a digital reference light information input unit 143, and a hologram generator 144.

The hologram property input unit 141 shown in FIG. 2E provides a hologram property information input window into which the user may input hologram property information that the user wants to the display unit (not shown). Accordingly, the user may input conditions of digital hologram property information including a property parameter of an image sensor (for example, a complementary metal-oxide semiconductor image sensor (CMOS), a charge-coupled device (CCD), etc.) (not shown) in which a digital hologram such as a resolution, a bit depth, a pixel size, etc. of a hologram that the user wants is to be generated and recorded, and an interference mode parameter to the hologram property information input window. In this case, the interference mode parameter is a parameter controlling an on-axis method in which object light and reference light are incident in a same axis and an off-axis interference mode in which the object light and the reference light are incident at a constant angle to each other. In addition, an interference mode parameter controlling an interference mode in a special case among off-axis interference modes, that is, a space movement off-axis interference mode in which interference between two pieces of light occurs due to a difference between spaces may be additionally used. In detail, the on-axis interference mode is a mode in which direct current (DC) information, real image information, and virtual image information appear at one position when a hologram is restored. In this mode, when the hologram is generated, fringe patterns (interference patterns) generally appear. On the other hand, the off-axis interference mode is a mode in which DC information, real image information, and virtual image information respectively separately appear when a hologram is restored. In this mode, when the hologram is generated, line patterns generally appear. Accordingly, when the user inputs conditions of the digital hologram property information, the user may select an interference mode that the user wants, from the 2 interference modes (the on-axis interference mode and the off-axis interference mode) described above. In addition, the user may additionally select the space movement off-axis method instead of the 2 interference modes (the on-axis interference mode and the off-axis interference mode). That is, in the on-axis and off-axis hologram generating device 100 according to an embodiment of the present disclosure, one of the 2 interference modes (the on-axis interference mode and the off-axis interference mode) or one of the 3 interference modes (the on-axis interference mode, the off-axis interference mode, and the space movement off-axis mode) may be selected and input to the hologram property input unit 141 in the digital hologram generator 140 by using an interference mode parameter.

The digital object light information input unit 142 included in the digital hologram generator 140 is connected to the digital object light generator 120 (in detail, the digital object light and information generator 123) to import digital object light information so that the imported digital light information is input to the digital object light information input unit 142. In addition, the digital reference light information input unit 143 included sin the digital hologram generator 140 is connected to the digital reference light generator 130 (in detail, the digital reference light and information generator 132) to import digital reference slight information so that the imported digital reference light information is input to the digital reference light information input unit 143. Then, the hologram property information input to the hologram property input unit 141, the digital object light information input to the digital object light information input unit 142, and the digital reference information input to the digital reference light information input unit 143 are transmitted to the hologram generator 144. The hologram generator 144 generates a digital hologram based on the transmitted hologram property information, digital object light information, and digital reference light information. This is expressed as Equation 2 below.

$$U_H(x,y)=U_{DO}(x,y)U_{RS}(x,y)+U_{DR}(x,y)U_{RS}(x,y)U_I(x,y) \quad \text{Equation 2}$$

In Equation 2 above, $U_H(x,y)$ represents the generated digital object hologram, $U_{DO}(x,y)$ represents digital object light, $U_{DR}(x,y)$ represents digital reference light, $U_{RS}(x,y)$ represents property parameter information that is physical information of an image sensor used to record a hologram input by the user, and $U_I(x,y)$ represents interference mode parameter information input by the user.

As described above, when the on-axis and off-axis digital hologram generating device 100 according to an embodiment of the present disclosure is used, virtual object light and virtual reference light are digitally synthesized with each other to thereby generate a wave optics-based digital hologram wherein both of the virtual object light and virtual reference light have phase information of an object of which a hologram is required to be generated.

Hereinafter, a difference between a hologram obtained by using the on-axis and off-axis digital hologram generating device 100 according to an embodiment of the present disclosure and an optically-obtained general hologram is described.

Figure 2F:
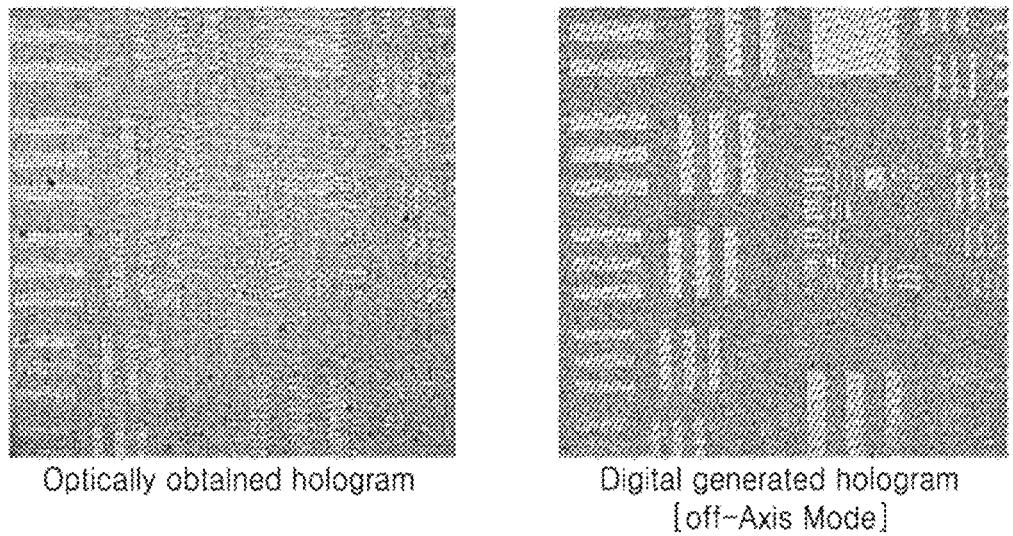
FIG. 2F is a diagram illustrating a difference between a resolution of an optically obtained general hologram and a resolution of a hologram obtained by using the on-axis and off-axis digital hologram generating device according to an embodiment of the present disclosure with respect to a United States air force (USAF) (particularly, 1951 USAF resolution test chart) target.
Figure 2G:
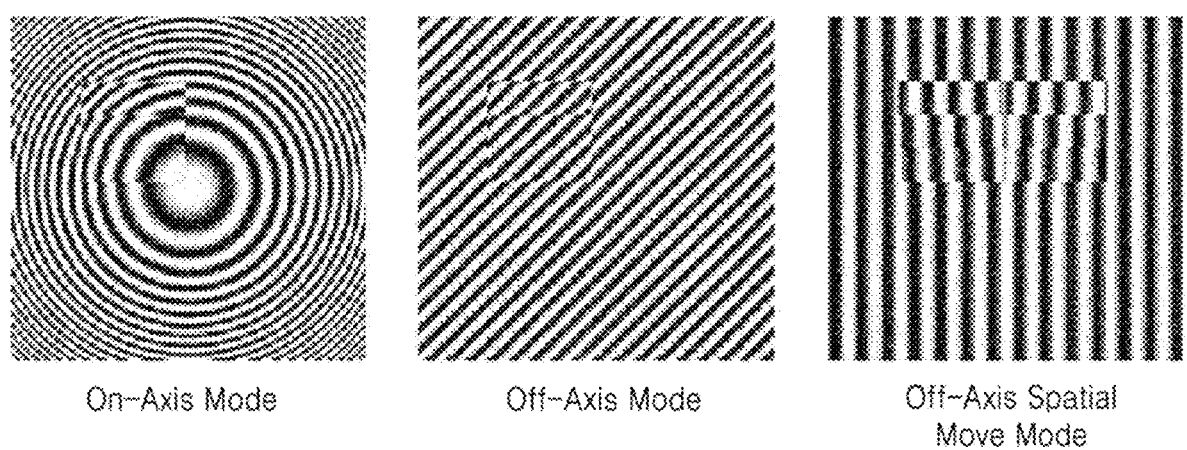
FIG. 2G is a diagram illustrating holograms obtained according to 3 interference modes (an on-axis interference mode, an off-axis interference mode, and a space movement off-axis method) by using the on-axis and off-axis digital hologram generating device according to an embodiment of the present disclosure with respect to a same target (specifically, a stair having different thicknesses in 3 steps).

FIG. 2F is a diagram illustrating a difference between a resolution of an optically obtained general hologram and a resolution of a hologram obtained by using the on-axis and off-axis digital hologram generating device 100 according to an embodiment of the present disclosure with respect to a United States air force (USAF) (particularly, 1951 USAF resolution test chart) target. FIG. 2G is a diagram illustrating holograms obtained according to 3 interference modes (an on-axis interference mode, an off-axis interference mode, and an off-axis space movement method) by using the on-axis and off-axis digital hologram generating device 100 according to an embodiment of the present disclosure with respect to a same target (specifically, a stair having different thicknesses in 3 steps).

The object (that is, the USAF target) phase information used to obtain a hologram obtained by using the on-axis and off-axis digital hologram generating device 100 according to an embodiment of the present disclosure 100 with respect to the USAF target, physical information of object light used by the object light property input unit 121 included in the digital object light generator 120 (that is, light wavelength information, wavenumber information, amplitude information, etc. of the object light), physical information of reference light used by the reference light property input unit 131 included in the digital reference light generator 130 (that is, light wavelength information, wavenumber information, amplitude information, etc. of the reference light), and hologram property information that the user may input to the hologram property input unit 141 included in the digital hologram generator 140 may respectively include interference mode information, hologram record distance information, a pixel size of an image sensor device to which recording is performed, a bit depth of the image sensor device to which recording is performed, a resolution of the image sensor device to which recording is performed, etc., but are not limited thereto.

In addition, it should be noted that a device and/or information used to obtain an optically obtained general hologram may include a laser device (a light source), an object lens, a light splitter, an optical mirror, a collimator, etc. but is not limited thereto.

As shown in FIG. 2F, it may be visually checked that, compared to a resolution of the optically obtained general hologram, a resolution of a hologram obtained by using the on-axis and off-axis digital hologram generating device 100 according to an embodiment of the present disclosure is clearly enhanced.

In addition, it may be checked that holograms obtained according to the 3 interference modes (the on-axis interference mode, the off-axis interference mode, and the space movement off-axis method) by using the on-axis and off-axis digital hologram generating device 100 according to an embodiment of the present disclosure are different from each other or respectively have a property. Here, the on-axis interference mode is a case when a path of the object light is spatially parallel with and matches that of the reference light. In the on-axis mode, interference patterns having a round fringe pattern are generated, and a space between the interference patterns is determined according to a degree of a curvature between the object light and the reference light. The off-axis interference mode is a case when a path of the object light forms a spatial tilt angle with a path of the reference light. A space between the interference patterns is determined by a tilt angle at which the interference patterns having a line shape are generated. The space movement off-axis mode is a case in which the object light and the reference light proceed in parallel with each other but do not proceed in a same path. In this mode, interference patterns having a line shape are generated and a space between the interference patterns is determined by a difference between the paths of the object light and the reference light.

Figure 2H:
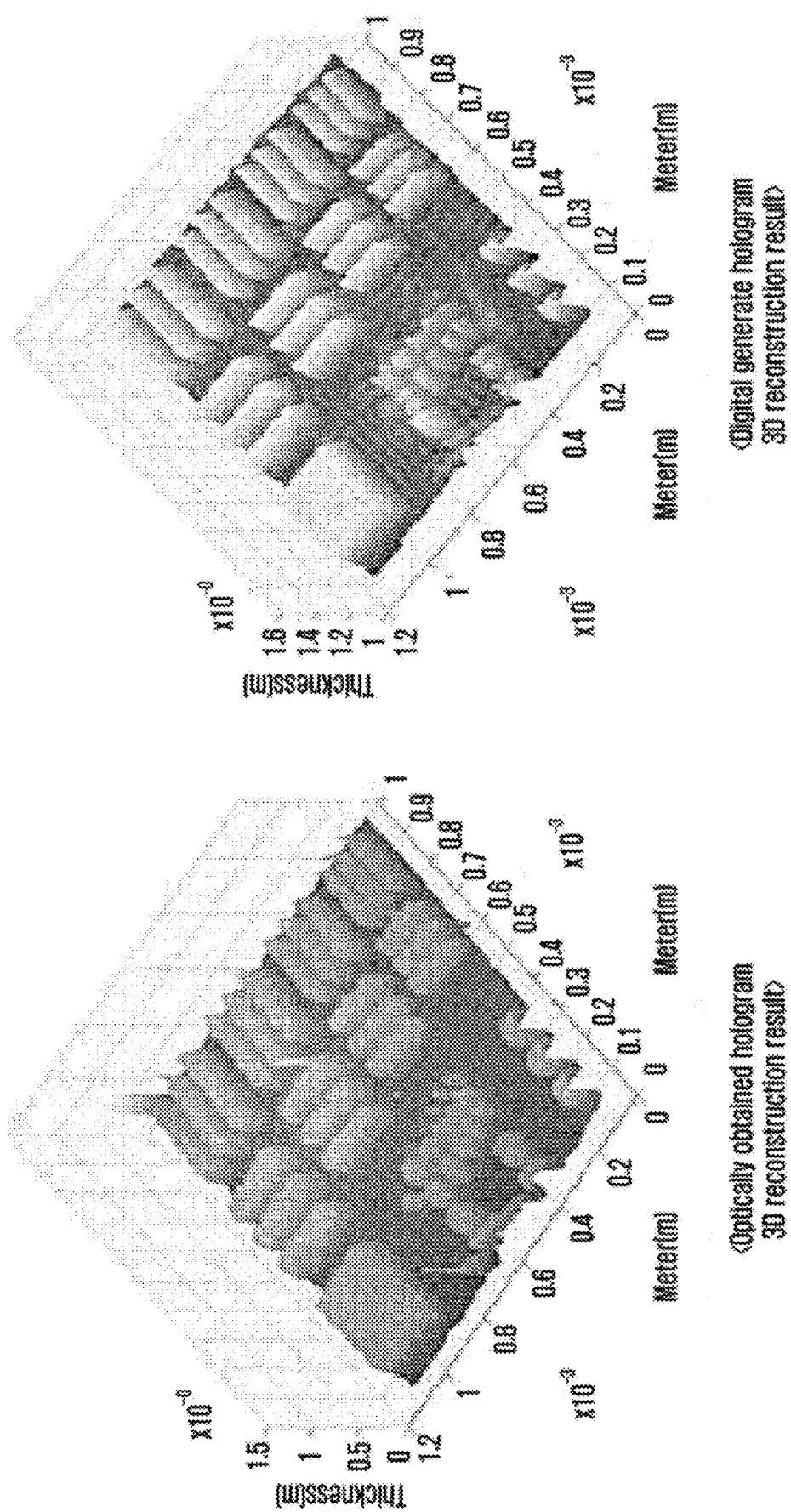
FIG. 2H is a diagram illustrating an optically obtained general hologram and a hologram obtained by using the on-axis and off-axis digital hologram generating device according to an embodiment of the present disclosure with respect to a same target.

FIG. 2H is a diagram illustrating an optically obtained general hologram and a hologram obtained by using the on-axis and off-axis digital hologram generating device 100 according to an embodiment of the present disclosure with respect to a same target.

As shown in FIG. 2H, it may be checked that, compared to a resolution of the optically obtained general hologram, a hologram obtained by using the on-axis and off-axis digital hologram generating device 100 according to an embodiment of the present disclosure is identical to an optically obtained actual hologram. Accordingly, in the present disclosure, a hologram identical to the optically obtained actual hologram may be generated without having to use a complicated and expensive optical device in a conventional technology.

Figure 3:
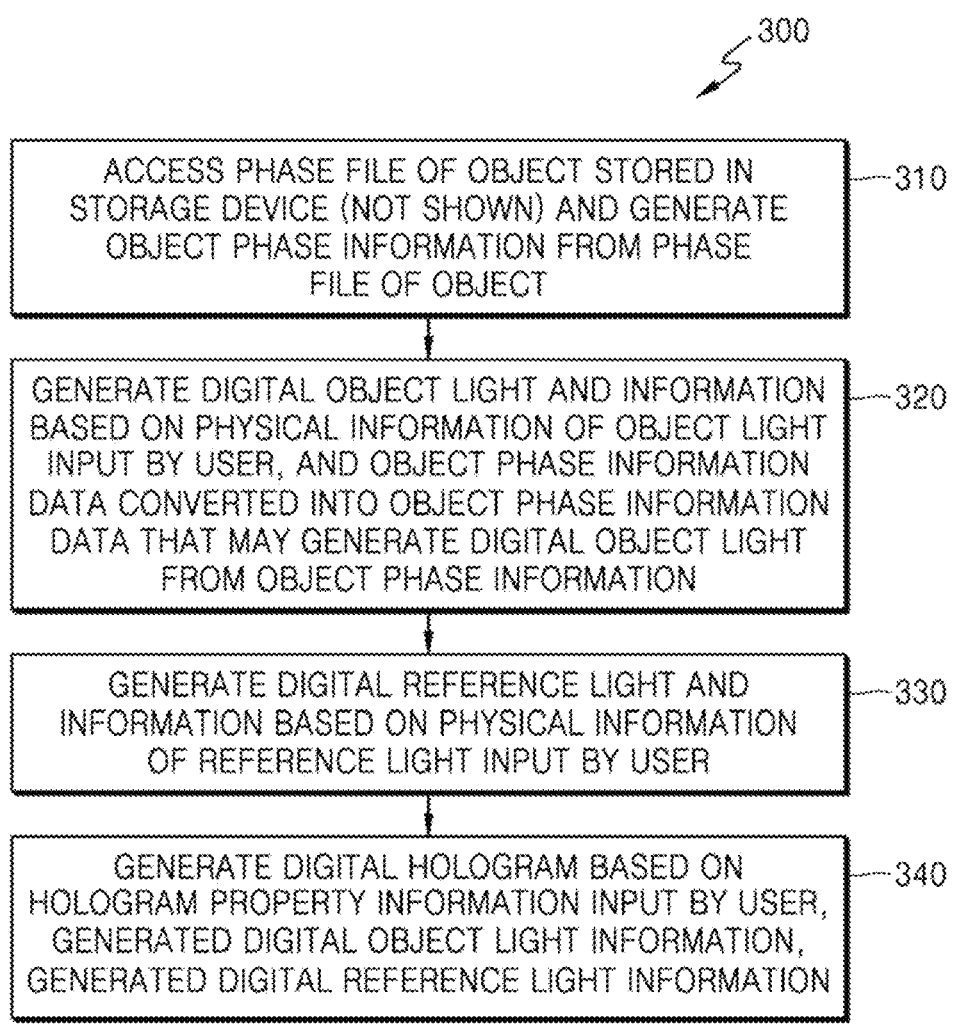
FIG. 3 is a flowchart of an on-axis and off-axis digital hologram generating method according to an embodiment of the present disclosure.

FIG. 3 is a flowchart of an on-axis and off-axis digital hologram generating method 300 according to an embodiment of the present disclosure.

Referring to FIG. 3 with FIGS. 2A through 2F, according to an embodiment of the present disclosure, the on-axis and off-axis digital hologram generating method 300 includes a) generating object phase information from a phase file of an object stored in a storage device (not shown) by accessing the phase file of the object (310); b) generating digital object light and information based on physical information of object light input by a user and object phase information data converted into object phase information data that may generate digital object light from the object phase information (320); c) generating digital reference light and information based on physical information of reference light input by the user (330); and d) generating a digital hologram based on hologram property information input by the user, information of the generated digital object light, information of the generated digital reference light (340).

In the on-axis and off-axis digital hologram generation method 300 according to an embodiment of the present disclosure described above, the operation a) includes a1) selecting the phase file of the object stored in the storage device (not shown) and transmitting the phase file of the object to the object phase file converter 112, the selecting and transmitting being performed by the object phase file position selector 112; a2) converting the phase file of the object into phase information data in a form that may be used by the object phase information generator 113 and transmitting the phase information data to the object phase information generator 113, the converting and transmitting being performed by the object phase file converter 112; and a3) generating the object phase information, the generating being performed by the object phase information generator 113.

In addition, in the on-axis and off-axis digital hologram generation method 300 according to an embodiment of the present disclosure described above, operation b) includes b1) inputting the input physical information of the object light to the object light property input unit 121, and converting the object phase information, obtained by the object phase information converter 122, into object phase information data that may generate the digital object light, the converting being performed by the object phase information converter 122; b2) inputting the input physical information of the object light and the object phase information data obtained by the converting to the digital object light and information generator 123; and b3) generating the digital object light and information based on the input physical information of the object light and the object phase information data obtained by the converting, the generating being performed by the digital object light and information generator 123.

In addition, in the on-axis and off-axis digital hologram generation method 300 according to an embodiment of the present disclosure described above, operation c) includes c1) inputting physical information of reference light that the user wants, the inputting being performed by the reference light property input unit 131; and c2) receiving the physical information of the reference light from the reference light property input unit 131 and generating digital reference light and information based on the physical information of the reference light, the receiving and generating being performed by the digital reference light and information generator 132.

In addition, in the on-axis and off-axis digital hologram generation method 300 according to an embodiment of the present disclosure described above, the digital object light is expressed as $U_{DO}(x,y)=U_L(x,y)U_O(x,y)U_{OP}(x,y)$, where $U_{DO}(x,y)$ represents the digital object light, $U_L(x,y)$ represents light property information of the digital object light, $U_O(x,y)$ represents converted phase information of the object, and $U_{OP}(x,y)$ represents position information of the object.

In addition, in the on-axis and off-axis digital hologram generation method 300 according to an embodiment of the present disclosure described above, the physical information of the object light includes light wavelength information, wavenumber information, and amplitude information of the object light needed to digitally generate light. The physical information of the reference light includes light wavelength information, wavenumber information, and amplitude information of the reference light needed to digitally generate light. The hologram property information refers to a property parameter of an image sensor to which the digital hologram is to be generated and recorded, and an interference mode parameter. Here, the property parameter of the image sensor includes a resolution, a bit depth, and a pixel size. The interference mode parameter is one among an on-axis interference mode, an off-axis interference mode, and a space movement off-axis interference mode.

In addition, in the on-axis and off-axis digital hologram generation method 300 according to an embodiment of the present disclosure described above, operation d) includes d1) inputting the hologram property information that the user wants to the hologram property input unit 141; d2) inputting the digital object light information to the digital object light information input unit 142; d3) inputting the digital reference light information to the digital reference light information input unit 143; d4) transmitting the hologram property information, the digital object light information, and the digital reference light information to the hologram generator 144; and d5) generating the digital hologram based on the hologram property information, the digital object light information, and the digital reference light information, the generating being performed by the hologram generator 144.

In addition, in the on-axis and off-axis digital hologram generation method 300 according to an embodiment of the present disclosure described above, the generated digital hologram is expressed as $U_H(x,y)=U_{DO}(x,y)U_{RS}(x,y)+U_{DR}(x,y)U_{RS}(x,y)U_I(x,y)$, where $U_H(x,y)$ represents the generated digital object hologram, $U_{DO}(x,y)$ represents the digital object light, $U_{DR}(x,y)$ represents the digital reference light, $U_{RS}(x,y)$ represents information about the property parameter that is physical information of the image sensor used to record a hologram input by the user, and $U_I(x,y)$ represents interference mode parameter information input by the user.

As described above, when the on-axis and off-axis digital hologram generating device 100 and method 300 are used according to the present disclosure, a wave optics-based digital hologram may be generated by digitally synthesizing virtual object light with virtual reference light, the virtual object light and the virtual reference light both having phase information of an object of which hologram is required to be generated. In detail, in the present disclosure, effects described herein may be obtained.

1. A hologram may be restored without having to use a complicated and expensive optical device.

2. A same hologram as an optically obtained actual hologram may be generated. In detail, when 3D information of an object is restored under a same condition for both of an optically obtained hologram and a hologram generated by using a simulation, it may be checked that a same result is obtained (refer to FIG. 2H).

3. A time period for which a hologram is generated is reduced. In detail, according to a general method using the CGH, when a hologram having a resolution of 1024×1024 is generated, it takes about 63617.10. According to a method proposed in a thesis on the CGH prepared by Seung-Cheol, Kim et. al, when a hologram having a same resolution of 1024×1024, it takes about 2673.86 seconds. On the other hand, when the on-axis and off-axis digital hologram generating device 100 is used in the present invention, a calculation speed per 1 point is about 0.92 ms. When a hologram having a resolution under the same condition described above (that is, the resolution of 1024×1024) based on the calculation speed of about 0.92 ms, it takes about 0.966 second.

4. A problem of using a large capacity of memory in a computer may be solved. In detail, according to the general method using the CGH, when a hologram having a resolution of 1024×1024 is generated, a memory of about 6 GB is required. According to the method proposed in a thesis on the CGH prepared by Seung-Cheol, Kim et. al, when a hologram having a resolution under the same condition described above, a memory of about 12 KB is required. On the other hand, when the on-axis and off-axis digital hologram generating device 100 in the present invention is used, a memory of about 6 KB is required when a hologram having a resolution under the same condition described above is generated.

5. When a research and/or an experiment are performed by using a hologram, since a pre-feasibility test for determination of occurrence of a failure of the research and/or the experiment or prediction of a final result may be performed in advance by using a simulation for generation of a hologram, waste of time and personnel due to unnecessary repeated researches and/or experiments may be significantly reduced.

6. The on-axis and off-axis digital hologram generating device 100 and method 300 may be highly utilized to educate personnel specialized in holograms and students.

INDUSTRIAL APPLICABILITY

Since various modifications may be formed as configurations or methods described and illustrated in this specification within the scope of the present disclosure, all details included in the detailed description or illustrated in the accompanying drawings are only examples and do not limit the present disclosure. Accordingly, the scope of the present disclosure is not limited to the embodiments described above, but is defined by the appended claims and equivalents of the appended claims.

The invention claimed is:

1. An on-axis and off-axis digital hologram generating device, the device comprising:
  a controller configured to control operations of components of the on-axis and off-axis digital hologram generating device;
  a power supplier configured to supply power to the controller;
  an input unit configured to receive user input of digital reference light information including at least light property of reference light; and
  a hologram property input unit including an input window configured to receive user input of hologram property information,
  wherein the controller is configured to
    access a phase file of an object stored in a storage device;
    convert the phase file of the object into object phase information in a useable form;

generate digital object light information based on a light property of object light input by a user and the converted object phase information; and generate a digital hologram based on (i) the received hologram property information, (ii) the generated digital object light information, and (iii) the received digital reference light information.

2. The device of claim 1, wherein physical information of the object light comprises light wavelength information, wavenumber information, and amplitude information of the object light, and the digital object light information comprises an object recorded position, object phase information, and light property information.

3. The device of claim 1, wherein the on-axis and off-axis digital hologram generating device further comprises:

a digital object light information input unit configured to receive input of the digital object light information.

4. The device of claim 1, wherein the hologram property information is a property parameter of an image sensor to which the digital hologram is generated and recorded, and an interference mode parameter.

5. The device of claim 4, wherein the property parameter of the image sensor comprises a resolution, a bit depth, and a pixel size, and the interference mode parameter is one among an on-axis interference mode, an off-axis interference mode, and a space movement off-axis interference mode.

6. An on-axis and off-axis digital hologram generating method, the method comprising:

receiving, via an input unit of an on-axis and off-axis digital hologram generating device, digital reference light information including at least light property of reference light;

receiving, via a hologram property input unit including a window, user input of hologram property information;

accessing, by a controller of the on-axis and off-axis digital hologram generating device, a phase file of an object stored in a storage device;

converting, by the controller, the phase file of the object into object phase information in useable form;

generating, by the controller of the on-axis and off-axis digital hologram generating device, digital object light and information based on a light property of object light input by the user, and the converted object phase information; and generating, by the controller of the on-axis and off-axis digital hologram generating device, a digital hologram based on (i) the received hologram property information, (ii) the generated digital object light information, and (iii) the received generated digital object light information.

7. The method of claim 6, wherein the digital object light is expressed as $U_{DO}(x,y)=U_L(x,y)U_O(x,y)U_{OP}(x,y)$, where $U_{DO}(x,y)$ represents the digital object light, $U_L(x,y)$ represents light property information of the object light, and $U_O(x,y)$ represents converted phase information of the object, and $U_{OP}(x,y)$ represents position information of the object, and the digital hologram is expressed as $U_H(x,y)=U_{DO}(x,y)U_{RS}(x,y)+U_{DR}(x,y)U_{RS}(x,y)U_I(x,y)$, where $U_H(x,y)$ represents the generated digital object hologram, $U_{DO}(x,y)$ represents the digital object light, $U_{DR}(x,y)$ represents the digital reference light, $U_{RS}(x,y)$ represents property parameter information of an image sensor used to input a hologram input by the user, and $U_I(x,y)$ represents interference mode parameter information input by the user.

8. The method of claim 6, wherein the physical information of the object light comprises light wavelength information, wavenumber information, and amplitude information of the object light needed to digitally generate light, the physical information of the reference light includes light wavelength information, wavenumber information, and amplitude information of the reference light needed to digitally generate light, and the hologram property information is a property parameter of an image sensor to which the digital hologram is to be generated and recorded, and an interference mode parameter.

9. The method of claim 8, wherein the property parameter of the image sensor comprises a resolution, a bit depth, and a pixel size, and the interference mode parameter is one among an on-axis interference mode, an off-axis interference mode, and a space movement off-axis interference mode.

* * * * *